(12) United States Patent  
Kolhouse

(10) Patent No.: US 9,689,333 B2  
(45) Date of Patent: Jun. 27, 2017

(54) DUAL-FUEL ENGINE WITH ENHANCED COLD START CAPABILITY

(71) Applicant: Cummins Inc., Columbus, IN (US)

(72) Inventor: Steven J. Kolhouse, Columbus, IN (US)

(73) Assignee: Cummins Inc., Columbus, IN (US)

( * ) Notice: Subject to any disclaimer, the term of this patent is extended or adjusted under 35 U.S.C. 154(b) by 171 days.

(21) Appl. No.: 14/807,327

(22) Filed: Jul. 23, 2015

(65) Prior Publication Data

US 2016/0025029 A1 Jan. 28, 2016

Related U.S. Application Data

(60) Provisional application No. 62/029,639, filed on Jul. 28, 2014.

(51) Int. Cl.
| | | |
|---|---|---|
| *F02D 19/10* | (2006.01) |
| *F02D 41/14* | (2006.01) |
| *F02D 41/06* | (2006.01) |
| *F02D 41/00* | (2006.01) |
| *F02D 19/08* | (2006.01) |

(52) U.S. Cl.
CPC ......... *F02D 41/1439* (2013.01); *F02D 19/10* (2013.01); *F02D 41/0025* (2013.01); *F02D 41/062* (2013.01); *F02D 19/081* (2013.01); *F02D 41/0027* (2013.01); *F02D 41/064* (2013.01); *Y02T 10/36* (2013.01)

(58) Field of Classification Search
CPC .......... F02D 41/14; F02D 41/00; F02D 41/30; F02D 41/3076; F02D 41/021; F02D 41/0027; F02D 41/1439; F02D 19/10; F02D 19/081; Y02T 10/36

See application file for complete search history.

(56) References Cited

U.S. PATENT DOCUMENTS

| | | | | |
|---|---|---|---|---|
| 4,377,149 A | * | 3/1983 | Naylor | F02D 33/006 123/510 |
| 5,566,653 A | | 10/1996 | Feuling | |
| 5,868,116 A | | 2/1999 | Betts et al. | |
| 5,870,978 A | | 2/1999 | Willi et al. | |
| 6,286,482 B1 | | 9/2001 | Flynn et al. | |
| 7,017,556 B2 | | 3/2006 | Borg et al. | |
| 7,093,588 B2 | | 8/2006 | Edwards | |
| 7,273,035 B2 | * | 9/2007 | Kinose | F02D 41/062 123/431 |
| 7,448,363 B1 | * | 11/2008 | Rasmussen | F02D 41/062 123/179.17 |
| 7,684,925 B2 | * | 3/2010 | Kuo | F02B 17/00 701/113 |
| 2008/0114527 A1 | | 5/2008 | McCarthy et al. | |
| 2013/0152898 A1 | | 6/2013 | Ki et al. | |

* cited by examiner

*Primary Examiner* — Hieu T Vo

(57) ABSTRACT

A method for operating a dual-fuel engine. Embodiments include receiving sensor input information, including information representative of a temperature of the engine. A first fuel, optionally diesel fuel, and a second fuel that is different than the first fuel, optionally natural gas, are supplied to the engine during a start mode when the engine temperature is below a normal operating temperature range. The first and second fuels can be supplied to the engine during a run mode when the engine temperature is within the normal operating temperature range.

24 Claims, 2 Drawing Sheets

DUAL-FUEL ENGINE WITH ENHANCED COLD START CAPABILITY

CROSS REFERENCE TO RELATED APPLICATION

This application claims the benefit of U.S. Provisional Application Ser. No. 62/029,639 filed on Jul. 28, 2014 and entitled Dual-Fuel Engine With Enhanced Cold Start Capability, which is incorporated herein by reference for all purposes.

TECHNICAL FIELD

The present invention relates generally to dual-fuel internal combustion engines and associated control systems.

BACKGROUND

Dual-fuel internal combustion engines and associated control systems are generally known. By way of example, the Edwards U.S. Pat. No. 7,093,588 discloses a dual-fuel engine that uses both a first fuel such as diesel fuel, and a second fuel such as natural gas or propane gas. Dual fuel engines that are configured to use diesel fuel are configured to run in a "diesel only mode" using only diesel fuel. Such dual-fuel engines therefore have relatively high compression ratios suitable for the efficient operation of the engines (typically 16:1 or greater). These engines are started in the diesel only mode, and are operated in the dual fuel mode when the engines reach normal operating temperatures. Catalytic and other exhaust after-treatment systems can be utilized to bring the emissions outputs of these engines within applicable regulatory standards.

There remains a continuing need for improved dual-fuel engines. In particular, there is a need for improved diesel-natural gas engines.

SUMMARY

Embodiments of the disclosure include a dual-fuel engine system comprising an engine having one or more engine cylinders, a fuel injection system, and a controller coupled to the fuel injection system. The fuel injection system is coupled to receive a first fuel, optionally diesel fuel, and a second fuel that is different than the first fuel, optionally natural gas, and to deliver the fuel into the engine. The controller is adapted to operate the engine in a dual fuel start mode and a dual fuel run mode.

Figure 1:
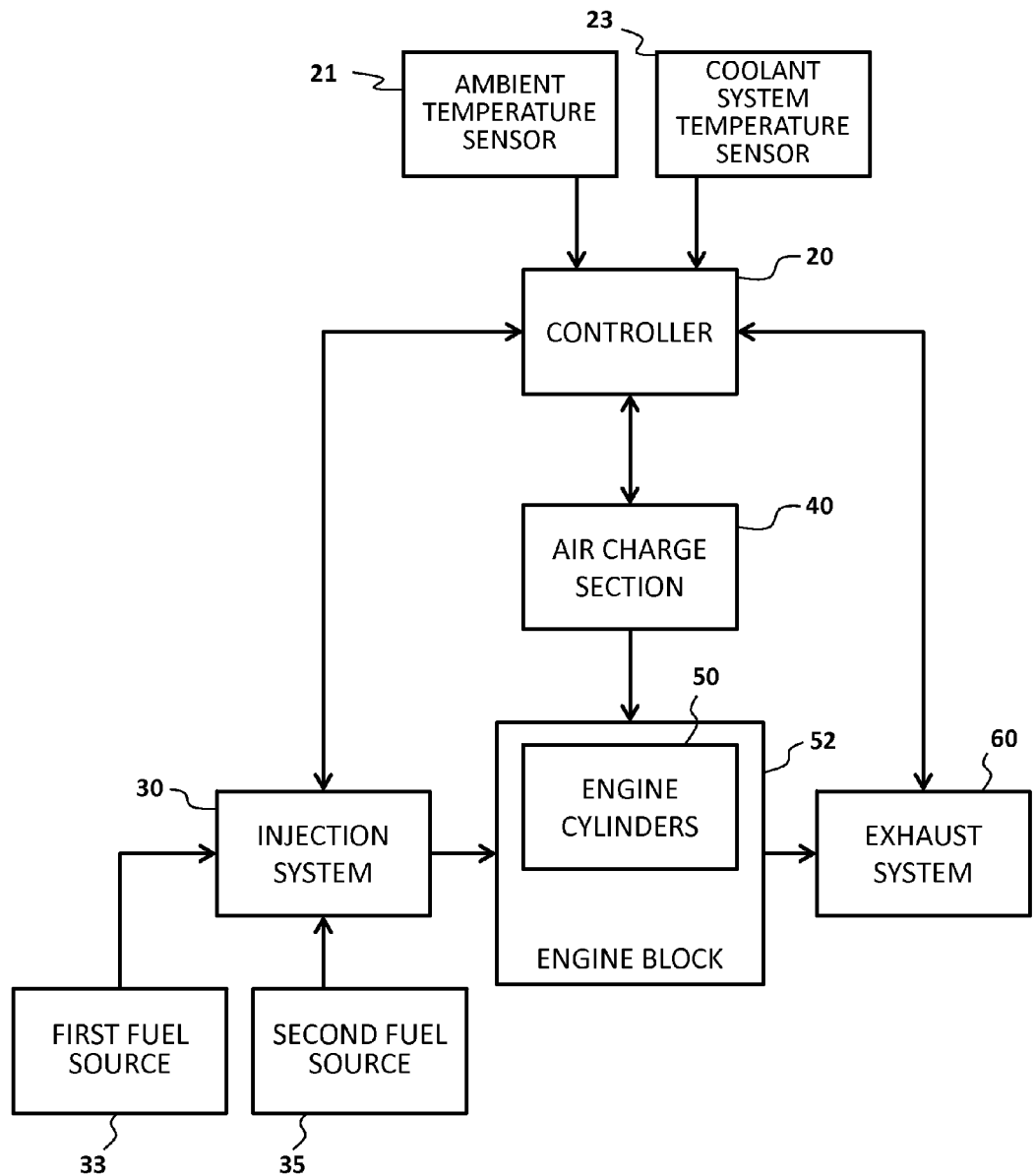
FIG. 1 is a schematic illustration of an engine system in accordance with embodiments of the invention.

While the disclosure is amenable to various modifications and alternative forms, specific embodiments have been shown by way of example in the drawings and described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

FIG. 1 is a schematic illustration of a dual-fuel engine system 10 in accordance with embodiments of the invention. As shown, the engine system 10 includes a controller 20, an engine block 52 including engine cylinders 50, and an injection system 30. Injection system 30 is coupled to first fuel source 33 and a second, primary fuel source 35, and delivers the first and second fuels into the one or more engine cylinders 50. An air charge section 40 delivers air into the engine cylinders 50 for combustion, and an exhaust system 60 is adapted to receive and treat combusted air and fuel (i.e., exhaust). Sensors such as an ambient air temperature sensor 21 and/or a coolant system temperature sensor 23 can be coupled to the controller 20. To help reduce emissions and enhance performance, the air charge section 40 can include an intake modification system (not shown), such as a turbocharger or exhaust gas recirculation system (EGR). The exhaust system 60 can be adapted to reduce emissions, and in some embodiments includes a diesel particulate filter (DPF) and/or a selective catalytic reduction (SCR) system.

In embodiments, the first fuel is diesel fuel and the second and primary fuel is natural gas or propane gas. Still other embodiments use other gas, such as biogas, as the primary fuel. Elements of engine system 10 including the engine block 52 are adapted to operate in several operating modes, including a start mode and a normal run mode. During the run mode, the engine block 52 will be at or near its specified or "normal" operating temperature range. The start mode can include so-called "cold starts" when the engine block 52 is at ambient temperatures below its normal operating temperature range, and starts when the engine block or components thereof are above ambient temperature but below the normal operating range. Engine system 10 is adapted to combust a mixture of the diesel fuel and the primary fuel during the start mode and the run mode. In embodiments, engine system 10 is configured to operate only in dual fuel modes, and does not have a diesel only mode.

Engine system 10 is adapted to combust a mixture of the first and second fuels in a ratio less than 50:50 during the run mode. In some embodiments, engine system 10 is adapted to combust a mixture of the first and second fuels in a ratio substantially less than 50:50 during the run mode. For example, in some embodiments, the engine system is adapted to combust a mixture of diesel fuel and natural gas in a ratio less than 40:60 during the run mode. Other embodiments of the engine system 10 are adapted to combust a mixture of diesel fuel and natural gas in a ratio less than 30:70, and even lower (e.g., 10:90 and optionally lower in some embodiments). During the start mode, engine system 10 can combust a mixture of the first and second fuels in the run mode ratios described above, or in ratio greater than 50:50. The diesel fuel enhances ignition of the fuel mixture, so a lower limit on the amount of diesel fuel (given other parameters and characteristics of the engine system such as the compression ratio) may be determined by the ability of the fuel to ignite.

To enable efficient operation with the relatively high amounts of the second fuel compared to the amount of diesel fuel during run mode, certain elements of the engine system 10 are adapted for operation with characteristics of engines that operate using only the second fuel. For example, embodiments of engine system 10 that operate using diesel fuel and natural gas can have engine cylinders 50 with compression ratios lower than those typically used for diesel engines, and better suited for operation with natural gas. The compression ratio of such an engine may, for example, be 15:1 or even lower. It is generally desirable to use a compression ratio that optimizes the efficiency of the operation of the engine system 10. However, as mentioned above, a lower limit on the compression ratio may be a ratio required to ignite the diesel fuel. If the compression ratio is too low, the diesel fuel may not properly ignite. A variety of factors such as fuel types, fuel quality, ambient air temperature, the presence and characteristics of an intake grid heater can affect the compression ratio of the engine system 10.

Another such factor is whether the engine system 10 has a glow plug (not shown in FIG. 1), and the operating characteristics of any such glow plug. Embodiments of engine system 10 typically do not have a glow plug or other ignition source such as a spark plug, and in particular do not use such ignition sources during the normal run mode. However, some embodiments of the engine system 10 have glow plugs and/or spark plugs (e.g., for use during the start mode).

In the embodiment shown in FIG. 1, the fuel from first source 33 and second source 35 are combined by the injection system 30 under the control of controller 20, and the fuel mixture is injected into the engine cylinders 50 through the injectors. For example, the cylinders can include separate injectors (not shown) for each type of fuel. Alternatively, a single injector in each cylinder can be used, and the gaseous primary fuel can be combined with the diesel fuel at a location close to the injector. An advantage of the engine system 10 is that enhanced dynamic control of the fuel mixture and its injection into the engine block 152 can be achieved.

Figure 2:
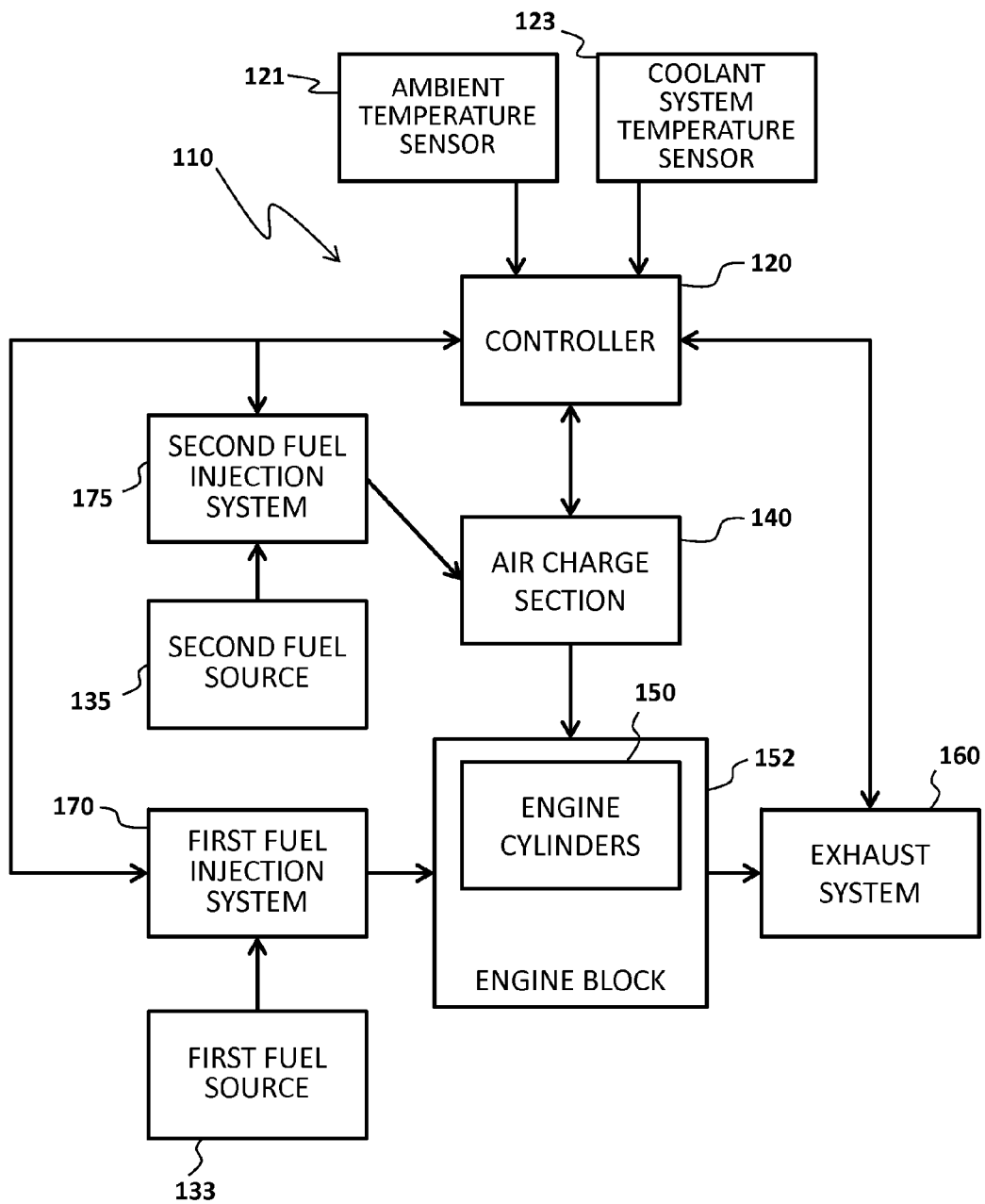
FIG. 2 is a schematic illustration of an engine system in accordance with other embodiments of the invention.

FIG. 2 is an illustration of engine system 110, another embodiment of the invention, which differs from the embodiment shown in FIG. 1 in that it has a first fuel injection system 170 and a second fuel injection system 172. The first fuel injection system 170 is coupled to the first fuel source 133, and injects the first fuel into the engine cylinders 150 (e.g., through injectors, not separately shown). The second fuel injection system 172 is coupled to the second fuel source, and injects the second fuel into the air charge section 140 (i.e., the second fuel is fumigated). The air and fumigated second fuel are then forced into the engine cylinders by the air charge section 140. Other elements of the engine system 110 can be similar to those of engine system 10 described above, and are identified in FIG. 2 with similar reference numbers. In still other embodiments (not shown) the first and second fuels can be inputted into the engine cylinders using other structures and methods. For example, in a variation of the system shown in FIG. 1, the second fuel can be applied into the air intake port of the engine cylinders, upstream of first fuel injectors, but downstream of the air charge section.

Controllers 20, 120 can, for example, be a programmed microprocessor, application specific integrated circuit (ASIC) or other electronic control device, and can include memory (not separately shown). Start algorithms can be implemented by the controllers 20, 120 based on one or more parameters such as the ambient temperature and coolant system temperature (as determined by sensors 21, 23, 121, 123) to aid engine starting and minimize engine emissions such as white smoke. Alternatively and in addition, the start algorithms can minimize the need for aqueous urea or diesel exhaust fluid (DEF) used in connection with the exhaust systems 60, 160. In still other embodiments the algorithms performed by controllers 20, 120 can cause the air charge section 40 to produce a pre-start pressurization of the engine cylinders 50, 150 with gaseous fuel upon recognition of start conditions. In other embodiments, the algorithms performed by controllers 20, 120 cause an engine start delay to allow gaseous priming of the engine cylinders 50, 150. Sensors, (e.g., a nitrogen oxide ($NO_x$) or oxygen sensor in the exhaust manifold) can provide information relative to the nature of the combustion that is occurring to the controllers 20, 120, and the controllers can use that information to adjust the mixture of the first and second fuels. Dynamic control of the dual fuel ratio may be especially effective in connection with embodiments of the system described in connection with FIG. 1.

In applications such as those described in connection with FIG. 2 where the gaseous fuel is fumigated controllers 20, 120 can delay the injection of diesel fuel for a period of time sufficient for the gaseous primary fuel to enter the cylinders. This delay can, for example, be determined by time following the initiation of engine cranking, or by a predetermined number of cranking cycles following the initiation of engine cranking In still other embodiments, the application of diesel fuel can be delayed until the presence of the primary fuel is detected in a location indicating that it can contribute to combustion in the cylinders (e.g., by a sensor (not shown) in an intake manifold that is coupled to the controllers).

In embodiments, controllers 20, 120 can include or be part of an ECM (engine control module) that receives data from various sensors, detectors, and components relating to engine and exhaust subsystem conditions, and generates control signals based on this information and perhaps other information, for example, stored in a database or memory integral to or separate from the ECM. The ECM may include a processor and software modules or routines that are executable by the ECM. In alternative embodiments, the ECM may include electronic circuits for performing some or all of the processing, including analog and/or digital circuitry. The modules may comprise a combination of electronic circuits and microprocessor based components. For example, the ECM may receive data indicative of engine performance, and exhaust gas composition including but not limited to engine sensor data, such as engine position sensor data, speed sensor data, exhaust mass flow sensor data, fuel rate data, pressure sensor data, temperature sensor data from locations throughout the engine and the exhaust subsystem, NOx sensor data, and other data. The ECM may then generate control signals or outputs to control various components in the combustion engine and exhaust subsystem.

In certain embodiments, engine system 10 includes a control system structured to perform certain operations. In certain embodiments, a controller forms a portion of a processing subsystem including one or more computing devices having memory, processing, and communication hardware. As used herein, the ECM is a controller and the functions and attributes of the controller described herein are ascribed to the ECM. The controller may be a single device or a distributed device, and the functions of the controller may be performed by hardware and/or as computer instructions on a non-transient computer readable storage medium.

In certain embodiments, the controller includes one or more modules structured to functionally execute the operations of the controller. The description herein including modules emphasizes the structural independence of certain aspects of the controller, and illustrates one grouping of operations and responsibilities of the controller. Other groupings that execute similar overall operations are understood within the scope of the present application. Modules may be implemented in hardware and/or as computer instructions on a non-transient computer readable storage medium, and modules may be distributed across various hardware or computer based components. The various functions of the different components can be combined or segregated as hardware and/or software modules in any manner, and can be useful separately or in combination. Input/output or I/O devices or user interfaces including but not limited to keyboards, displays, pointing devices, and the like can be coupled to the system either directly or through intervening I/O controllers. Thus, the various aspects of the disclosure may be embodied in many different forms, and all such forms are contemplated to be within the scope of the disclosure.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

One of skill in the art, having the benefit of the disclosures herein, will recognize that in certain embodiments of the present disclosure a controller may be structured to perform operations that improve various technologies and provide improvements in various technological fields. Without limitation, example and non-limiting technology improvements include improvements in combustion performance of internal combustion engines, improvements in emissions performance, aftertreatment system regeneration, engine torque generation and torque control, engine fuel economy performance, improved durability of exhaust subsystem components for internal combustion engines, and engine noise and vibration control. Without limitation, example and non-limiting technological fields that are improved include the technological fields of internal combustion engines, fuel systems therefore, aftertreatment systems therefore, air handling devices therefore, and intake and exhaust devices therefore.

Certain operations described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

Many aspects of the disclosure are described in terms of sequences of actions can be performed by elements of a computer system or other hardware capable of executing programmed instructions, for example, a general purpose computer, special purpose computer, workstation, or other programmable data processing apparatus. It will be recognized that in each of the embodiments, the various actions could be performed by specialized circuits (e.g., discrete logic gates interconnected to perform a specialized function), by program instructions (software), such as logical blocks, program modules, etc. being executed by one or more processors (e.g., one or more microprocessors, a central processing unit (CPU), and/or application specific integrated circuit (ASIC)), or by a combination of both. For example, embodiments can be implemented in hardware, software, firmware, middleware, microcode, or any combination thereof. The instructions can be program code or code segments that perform necessary tasks and can be stored in a non-transitory machine-readable medium such as a storage medium or other storage(s). A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents.

The non-transitory machine-readable medium can additionally be considered to be embodied within any tangible form of computer readable carrier, such as solid-state memory, magnetic disk, and optical disk containing an appropriate set of computer instructions, such as program modules, and data structures that would cause a processor to carry out the techniques described herein. A computer-readable medium may include the following: an electrical connection having one or more wires, magnetic disk storage, magnetic cassettes, magnetic tape or other magnetic storage devices, a portable computer diskette, a random access memory (RAM), a read-only memory (ROM), an erasable programmable read-only memory (e.g., EPROM, EEPROM, or Flash memory), or any other tangible medium capable of storing information.

Although the invention has been described with reference to preferred embodiments, those of skill in the art will recognize that changes can be made in form and detail without departing from the spirit and scope of the invention.

The invention claimed is:

1. An engine system, comprising:
an engine having one or more engine cylinders;
a fuel injection system coupled to receive a first fuel, optionally diesel fuel, and a second fuel that is different than the first fuel, optionally natural gas, and to deliver the fuel into the engine; and
a controller coupled to the fuel injection system and adapted to operate the engine in a dual fuel start mode and a dual fuel run mode.

2. The engine system of claim 1 wherein the controller is adapted to not cause operation of the engine in first fuel only mode.

3. The engine system of claim 1 wherein the first fuel is diesel fuel, and the controller causes the ratio of the first fuel to the second fuel to be less than 40:60 during the run mode.

4. The engine system of claim 1 wherein the first fuel is diesel fuel, and the controller causes the ratio of the first fuel to the second fuel to be less than 30:70 during the run mode.

5. The engine system of claim 1 wherein the first fuel is diesel fuel, and the controller causes the ratio of the first fuel to the second fuel to be less than 20:80 during the run mode.

6. The engine system of claim 1 wherein the engine cylinders have a compression ratio less than 16:1.

7. The engine system of claim 1 wherein the engine cylinders have a compression ratio less than 15:1.

8. The engine system of claim 1 wherein the controller is coupled to receive one or more sensor inputs and dynamically controls the ratio of the first fuel to the second fuel during one or both of the run mode and the start mode on the basis of the one or more sensor inputs.

9. The engine system of claim 8 wherein the controller is coupled to receive one or more of an ambient temperature sensor input and a coolant system temperature input.

10. The engine system of claim 1 wherein the controller is adapted to minimize engine emissions during the start mode.

11. The engine system of claim 1 wherein the engine cylinders have a compression ratio optimized for the dual fuel ratio during the run mode.

12. The engine system of claim 1 wherein each engine cylinder does not have one or both of a glow plug and a spark plug.

13. The engine system of claim 1 wherein the engine is adapted to meet applicable diesel-only emissions regulations.

14. The engine system of claim 1 wherein the injection system includes a fumigation system.

15. The engine system of claim 1 and further including a sensor for sensing fuel presence coupled to the controller, and wherein the controller controls the fuel injection system based on information received from the sensor.

16. The engine system of claim 1 and further including a sensor for sensing exhaust coupled to the controller, and wherein the controller controls the fuel injection system based information received from the sensor.

17. The engine system of claim 1 wherein:
the controller receives information representative of a temperature of the engine;
the controller operates the engine during the start mode when the engine temperature is below a normal operating temperature range; and
the controller operates the engine during the run mode when the engine temperature is within a normal operating temperature range.

18. A method for operating an engine, comprising:
receiving sensor input information, including information representative of a temperature of the engine;
supplying a first fuel, optionally diesel fuel, and a second fuel that is different than the first fuel, optionally natural gas, to the engine during a start mode when the engine temperature is below a normal operating temperature range; and
supplying the first and second fuels to the engine during a run mode when the engine temperature is within the normal operating temperature range.

19. The method of claim 18 wherein the first fuel is diesel fuel, and supplying the first and second fuels during the run mode includes causing the ratio of the first fuel to the second fuel to be less than 50:50.

20. The method of claim 18 and further including dynamically controlling the ratio of the first fuel to the second fuel during one or both of the run mode and the start mode based on the sensor input information.

21. The method of claim 20 wherein receiving sensor input information includes receiving information representative of one or more of ambient air temperature, engine coolant temperature, and exhaust gas.

22. The method of claim 20 wherein dynamically controlling the ratio of the first fuel to the second fuel includes controlling the ratio of the first fuel to the second fuel to minimize engine emissions.

23. The method of claim 18 and further including pre-start pressurizing the engine.

24. The method of claim 18 and further including delaying the supply of the first fuel for a period of time sufficient for the second fuel to enter cylinders of the engine during the start mode.

* * * * *